United States Patent
Metius et al.

(10) Patent No.: US 9,127,326 B2
(45) Date of Patent: *Sep. 8, 2015

(54) SYSTEM AND METHOD FOR REDUCING IRON OXIDE TO METALLIC IRON USING NATURAL GAS

(71) Applicants: Gary E. Metius, Charlotte, NC (US); James M. McClelland, Jr., Cornelius, NC (US); David C. Meissner, Charlotte, NC (US); Stephen C. Montague, Charlotte, NC (US)

(72) Inventors: Gary E. Metius, Charlotte, NC (US); James M. McClelland, Jr., Cornelius, NC (US); David C. Meissner, Charlotte, NC (US); Stephen C. Montague, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/069,493

(22) Filed: Nov. 1, 2013

(65) Prior Publication Data

US 2014/0053686 A1  Feb. 27, 2014

Related U.S. Application Data

(63) Continuation-in-part of application No. 13/363,044, filed on Jan. 31, 2012, now Pat. No. 8,685,136, and a (Continued)

(51) Int. Cl.
*C21B 13/02* (2006.01)
*C21B 5/00* (2006.01)
*C21B 13/00* (2006.01)

(52) U.S. Cl.
CPC ............. *C21B 5/001* (2013.01); *C21B 13/0073* (2013.01); *C21B 13/02* (2013.01); *C21B 2100/02* (2013.01); *C21B 2100/04* (2013.01); *C21B 2100/06* (2013.01); *Y02W 30/54* (2015.05)

(58) Field of Classification Search
CPC ........................... C21B 13/0073; C21B 13/02
See application file for complete search history.

(56) References Cited

U.S. PATENT DOCUMENTS

| | | |
|---|---|---|
| 3,905,201 A | 9/1975 | Coveney et al. |
| 4,041,130 A | 8/1977 | Mackles |
| 4,365,789 A | 12/1982 | Scarlett et al. |

(Continued)

FOREIGN PATENT DOCUMENTS

EP     0095035 A2 * 11/1983

OTHER PUBLICATIONS

Feb. 26, 2015 Office Action issued in U.S. Appl. No. 13/955,654.

(Continued)

*Primary Examiner* — George Wyszomierski
*Assistant Examiner* — Tima M McGuthry Banks
(74) *Attorney, Agent, or Firm* — Clements Bernard PLLC; Christopher L. Bernard; Lawrence A. Baratta, Jr.

(57) ABSTRACT

In various exemplary embodiments, the present invention provides systems and methods that can convert clean or raw natural gas, clean or dirty coke oven gas, or the like to reducing gas/syngas suitable for direct reduction with minimal processing or cleaning. Hydrocarbons and the like are converted to $H_2$ and CO. S does not affect the conversion to reducing gas/syngas, but is removed or otherwise cleaned up by the iron bed in the direct reduction shaft furnace. Top gas may be continuously recycled or a once-through approach may be employed.

34 Claims, 3 Drawing Sheets

Related U.S. Application Data continuation-in-part of application No. 13/107,013, filed on May 13, 2011, now Pat. No. 8,496,730, application No. 14/069,493, which is a continuation-in-part of application No. 13/955,654, filed on Jul. 31, 2013, now Pat. No. 9,028,585.

(60) Provisional application No. 61/334,786, filed on May 14, 2010.

(56) References Cited

U.S. PATENT DOCUMENTS

| | | | |
|---|---|---|---|
| 4,384,886 A * | 5/1983 | Stift | 75/487 |
| 4,591,380 A | 5/1986 | Summers et al. | |
| 4,793,856 A | 12/1988 | Price-Falcon et al. | |
| 4,822,411 A | 4/1989 | Standler et al. | |
| 4,889,323 A | 12/1989 | Pusch et al. | |
| 5,958,107 A * | 9/1999 | Greenwalt | 75/492 |
| 5,997,596 A | 12/1999 | Joshi et al. | |
| 6,027,545 A | 2/2000 | Villarreal-Trevino | |
| 6,328,946 B1 | 12/2001 | Stephens, Jr. | |
| 6,986,800 B2 | 1/2006 | Duarte-Escareno et al. | |
| 8,496,730 B2 | 7/2013 | Metius et al. | |
| 2004/0226406 A1 | 11/2004 | Duarte-Escareno et al. | |
| 2009/0211401 A1 | 8/2009 | Zendejas-Martinez et al. | |
| 2012/0036960 A1 * | 2/2012 | Hoffman | 75/10.67 |

OTHER PUBLICATIONS

Peter Diemer, Klaus Knop, Hans Bodo Lungen, Martin Reinke, Carl-Dieter Wuppermann; "Utilization of Coke Oven Gas for the Production of DRI" (Technik + Trends—Metallurgic); Stahl and Eisen 127 (2007) Nr. 1; Paper presented at STAHL 2006 Conference on Nov. 9, 2006 in Dusseldorf.

* cited by examiner

SYSTEM AND METHOD FOR REDUCING IRON OXIDE TO METALLIC IRON USING NATURAL GAS

CROSS-REFERENCE TO RELATED APPLICATION(S)

The present patent application/patent is a continuation-in-part of U.S. patent application Ser. No. 13/955,654 now U.S. Pat. No. 9,028,585), filed on Jul. 31, 2013, and entitled "SYSTEM AND METHOD FOR REDUCING IRON OXIDE TO METALLIC IRON USING COKE OVEN GAS AND OXYGEN STEELMAKING FURNACE GAS," which is a continuation-in-part of U.S. patent application Ser. No. 13/363,044 now U.S. Pat. No. 8,685,136), filed on Jan. 31, 2012, and entitled "SYSTEM AND METHOD FOR REDUCING IRON OXIDE TO METALLIC IRON USING COKE OVEN GAS AND OXYGEN STEELMAKING FURNACE GAS," which is a continuation-in-part of U.S. patent application Ser. No. 13/107,013 now U.S. Pat. No. 8,496,730), filed on May 13, 2011, and entitled "SYSTEM AND METHOD FOR REDUCING IRON OXIDE TO METALLIC IRON USING COKE OVEN GAS AND OXYGEN STEELMAKING FURNACE GAS," which claims the benefit of priority of U.S. Provisional Patent Application No. 61/334,786, filed on May 14, 2010, and entitled "SYSTEM AND METHOD FOR REDUCING IRON OXIDE TO METALLIC IRON USING COKE OVEN GAS AND OXYGEN STEELMAKING FURNACE GAS," the contents of all of which are incorporated in full by reference herein.

FIELD OF THE INVENTION

The present invention relates generally to a novel system and method for reducing iron oxide to metallic iron using clean or raw (i.e. nearly well head) natural gas (NG), clean or dirty coke oven gas (COG), or the like. More specifically, the present invention utilizes a thermal reaction system (TRS) to reform the NG or the like with minimal processing or cleaning, such that a synthesis gas (syngas) suitable for direct reduction results.

BACKGROUND OF THE INVENTION

Conventional reforming processes for the direct reduction (DR) of iron oxide to metallic iron utilize NG that has been processed or cleaned to remove impurities, such as hydrocarbons (gases and liquids), excess carbon dioxide ($CO_2$), sulfur (S), etc. Most reformers can handle some ethane ($C_2H_6$), propane ($C_3H_8$), butane ($C_4H_{10}$), and traces of $C_{5+}$, but are primarily designed for reforming methane ($CH_4$) with a top gas, for example. S acts as a catalyst poison and can only be tolerated in low ppm quantities, in the range of 5 to 10 ppm.

Thus, what is still needed in the art are systems and methods that replace the reformer with an alternative component that can convert clean or raw NG, clean or dirty COG, or the like to reducing gas/syngas suitable for DR with minimal processing or cleaning. Hydrocarbons and the like would be converted to hydrogen ($H_2$) and carbon monoxide (CO). S would not affect the conversion to reducing gas/syngas, but would be removed or otherwise cleaned up by the iron bed in the DR shaft furnace.

BRIEF SUMMARY OF THE INVENTION

In various exemplary embodiments, the present invention provides precisely this—systems and methods that replace the reformer with an alternative component that can convert clean or raw NG, clean or dirty COG, or the like to reducing gas/syngas suitable for DR with minimal processing or cleaning Hydrocarbons and the like are converted to $H_2$ and CO. S does not affect the conversion to syngas, but is removed or otherwise cleaned up by the iron bed in the DR shaft furnace. It should be noted that, direct reduced iron (DRI) contaminated with high levels of S may not be suitable as electric arc furnace (EAF) feedstock, but may be suitable as metalized feedstock to a blast furnace, for example.

In one exemplary embodiment, the present invention provides a method for reducing iron oxide to metallic iron, comprising: providing a top gas stream from a direct reduction shaft furnace; removing carbon dioxide from the top gas stream using a carbon dioxide removal system; heating the top gas stream in a gas heater to form a reducing gas stream and providing the reducing gas stream to the direct reduction shaft furnace to reduce the iron oxide to the metallic iron; and adding one of a natural gas stream and a coke oven gas stream to the reducing gas stream as a synthesis gas stream. The one of the natural gas stream and the coke oven gas stream comprises one or more of a hydrocarbon, hydrogen, carbon monoxide, carbon dioxide, and sulfur. The method also comprises preheating the one of the natural gas stream and the coke oven gas stream in a preheater prior to adding the one of the natural gas stream and the coke oven gas stream to the reducing gas stream as the synthesis gas stream. The method further comprises reacting the preheated one of the natural gas stream and the coke oven gas stream in a thermal reaction system to form the synthesis gas stream. The thermal reaction system comprises a hot oxygen burner and a nozzle that utilize oxygen and a fuel. The oxygen is received from an air separation plant. The fuel comprises a portion of the top gas stream. The method still further comprises providing a portion of the one of the natural gas stream and the coke oven gas stream to the gas heater as fuel. The method still further comprises firing the preheater with a portion of the top gas stream. The method still further comprises providing a portion of the preheated one of the natural gas stream and the coke oven gas stream to the direct reduction shaft furnace as one or more of bustle enrichment gas and transition zone gas. The method still further comprises adding oxygen to the bustle gas. The method still further comprises generating steam in a boiler using sensible heat of the top gas stream and utilizing the steam in the (absorption type) carbon dioxide removal system. The method still further comprises providing a portion of the top gas stream to the gas heater as fuel.

In another exemplary embodiment, the present invention provides a method for reducing iron oxide to metallic iron, comprising: providing a top gas stream from a direct reduction shaft furnace; removing carbon dioxide from the top gas stream using a carbon dioxide removal system; removing moisture from the top gas stream using a saturator; heating the top gas stream in a gas heater to form a reducing gas stream and providing the reducing gas stream to the direct reduction shaft furnace to reduce the iron oxide to the metallic iron; and adding one of a natural gas stream and a coke oven gas stream to the top gas stream as a synthesis gas stream. The one of the natural gas stream and the coke oven gas stream comprises one or more of a hydrocarbon, hydrogen, carbon monoxide, carbon dioxide, and sulfur. The method also comprises preheating the one of the natural gas stream and the coke oven gas stream in a heat exchanger to form the synthesis gas stream. The method further comprises reacting the preheated one of the natural gas stream and the coke oven gas stream in a thermal reaction system to form the synthesis gas stream. The thermal reaction system comprises a hot oxygen burner and a nozzle that utilize oxygen and a fuel. The oxygen is received from an air separation plant. The fuel comprises a portion of the top gas stream. The method still further comprises cooling the preheated and reacted one of the natural gas stream and the coke oven gas stream in a boiler and the heat exchanger to form the synthesis gas stream. The method still further comprises providing a portion of the one of the natural gas stream and the coke oven gas stream to the gas heater as fuel. The heat exchanger operates by cross-exchange of the synthesis gas stream with one of the natural gas stream and the coke oven gas stream. The method still further comprises providing a portion of the preheated one of the natural gas stream and the coke oven gas stream to the direct reduction shaft furnace as one or more of bustle enrichment gas and transition zone gas. The method still further comprises generating steam in a first boiler using the top gas stream and utilizing the steam in the (absorption type) carbon dioxide removal system. The method still further comprises generating steam in a second boiler using the preheated and reacted one of the natural gas stream and the coke oven gas stream and utilizing the steam in the carbon dioxide removal system. The method still further comprises providing a portion of the top gas stream to the gas heater as fuel. The method still further comprises adding oxygen to the reducing gas stream.

In a further exemplary embodiment, the present invention provides a method for reducing iron oxide to metallic iron, comprising: providing one of a natural gas stream and a coke oven gas stream; preheating the one of the natural gas stream and the coke oven gas stream in a heat exchanger; reacting the preheated one of the natural gas stream and the coke oven gas stream in a thermal reaction system to form a reducing gas stream; and providing the reducing gas stream to a direct reduction shaft furnace to reduce the iron oxide to the metallic iron. The one of the natural gas stream and the coke oven gas stream comprises one or more of a hydrocarbon, hydrogen, carbon monoxide, carbon dioxide, and sulfur. The thermal reaction system comprises a hot oxygen burner and a nozzle that utilize oxygen and a fuel. The oxygen is received from an air separation plant. The fuel comprises a portion of a top gas stream derived from the direct reduction shaft furnace that is cooled in the heat exchanger and cleaned in a scrubber. The one of the natural gas stream and the coke oven gas stream is preheated in the heat exchanger by cross-exchange with the top gas stream. The method also comprises providing a portion of the preheated one of the natural gas stream and the coke oven gas stream to the direct reduction shaft furnace as one or more of bustle enrichment gas and transition zone gas. The method further comprises utilizing a remaining portion of the cooled/cleaned top gas stream in one or more of a power generation system and a steelmaking facility.

BRIEF DESCRIPTION OF THE DRAWINGS

The present invention is illustrated and described herein with reference to the various drawings, in which like reference numbers are used to denote like system components/method steps, as appropriate, and in which:

FIG. 1 is a schematic diagram illustrating one exemplary embodiment of the novel system and method for reducing iron oxide to metallic iron using clean or raw NG of the present invention—specifically, clean or raw NG is used in conjunction with a low-carbon (i.e. up to about 1-2%) DR plant, such as hot briquetted iron (HBI) plant or the like;

FIG. 2 is another schematic diagram illustrating an alternative exemplary embodiment of the novel system and method for reducing iron oxide to metallic iron using clean or raw NG of the present invention—specifically, clean or raw NG is used in conjunction with a high-carbon (i.e. greater than about 2%) DR plant or the like.

DETAILED DESCRIPTION OF THE INVENTION

Figure 1:
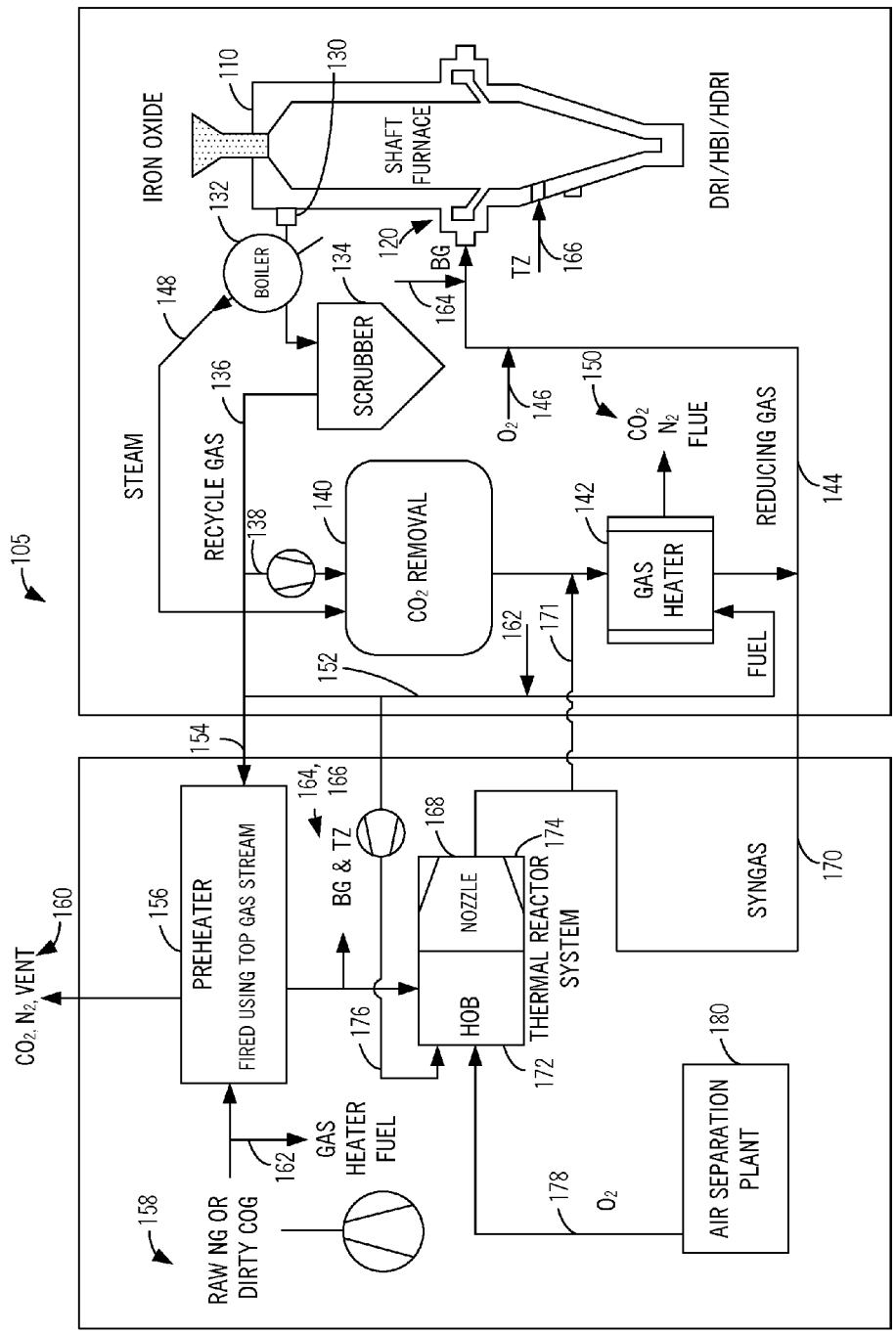
Figure 2:
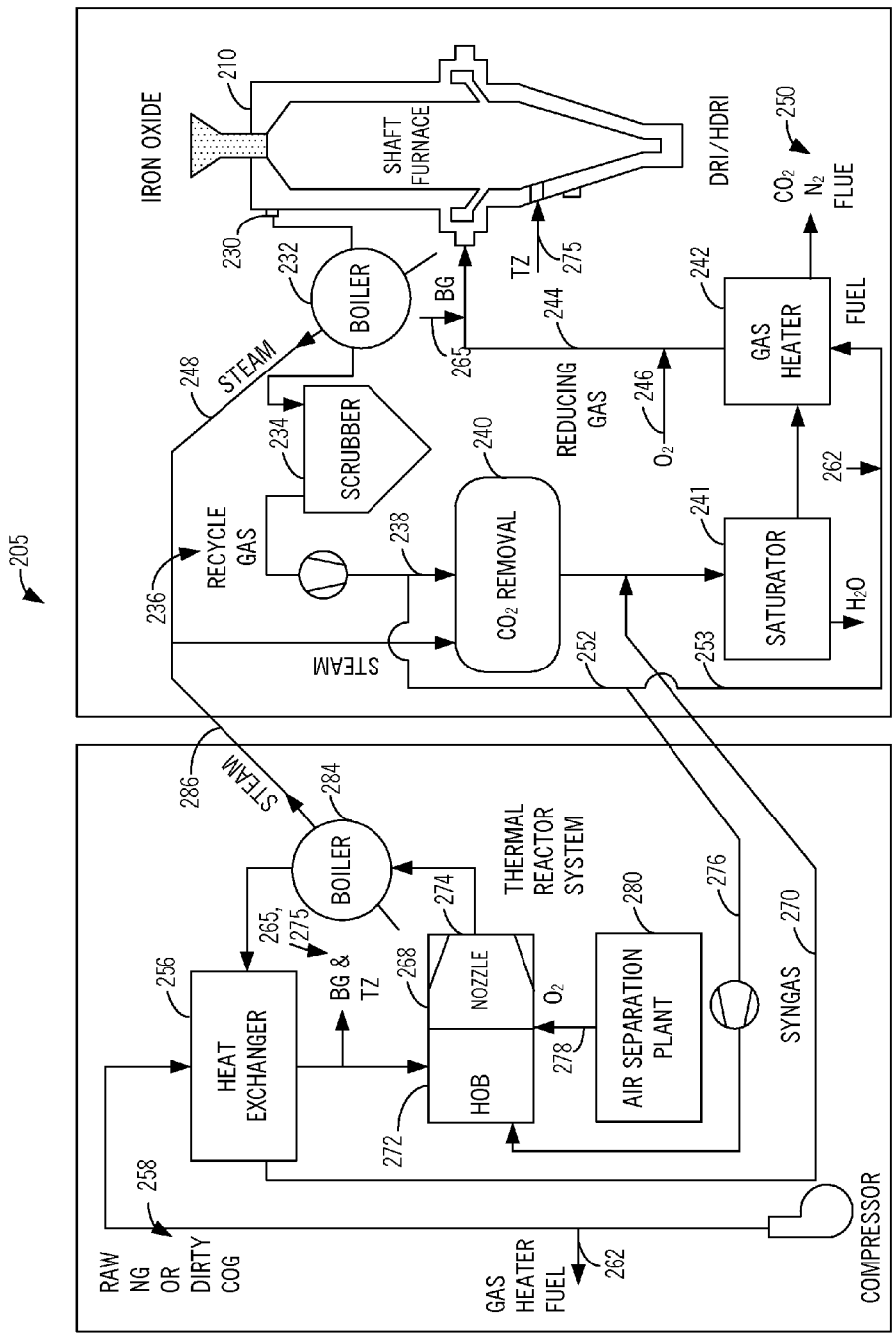
Figure 3:
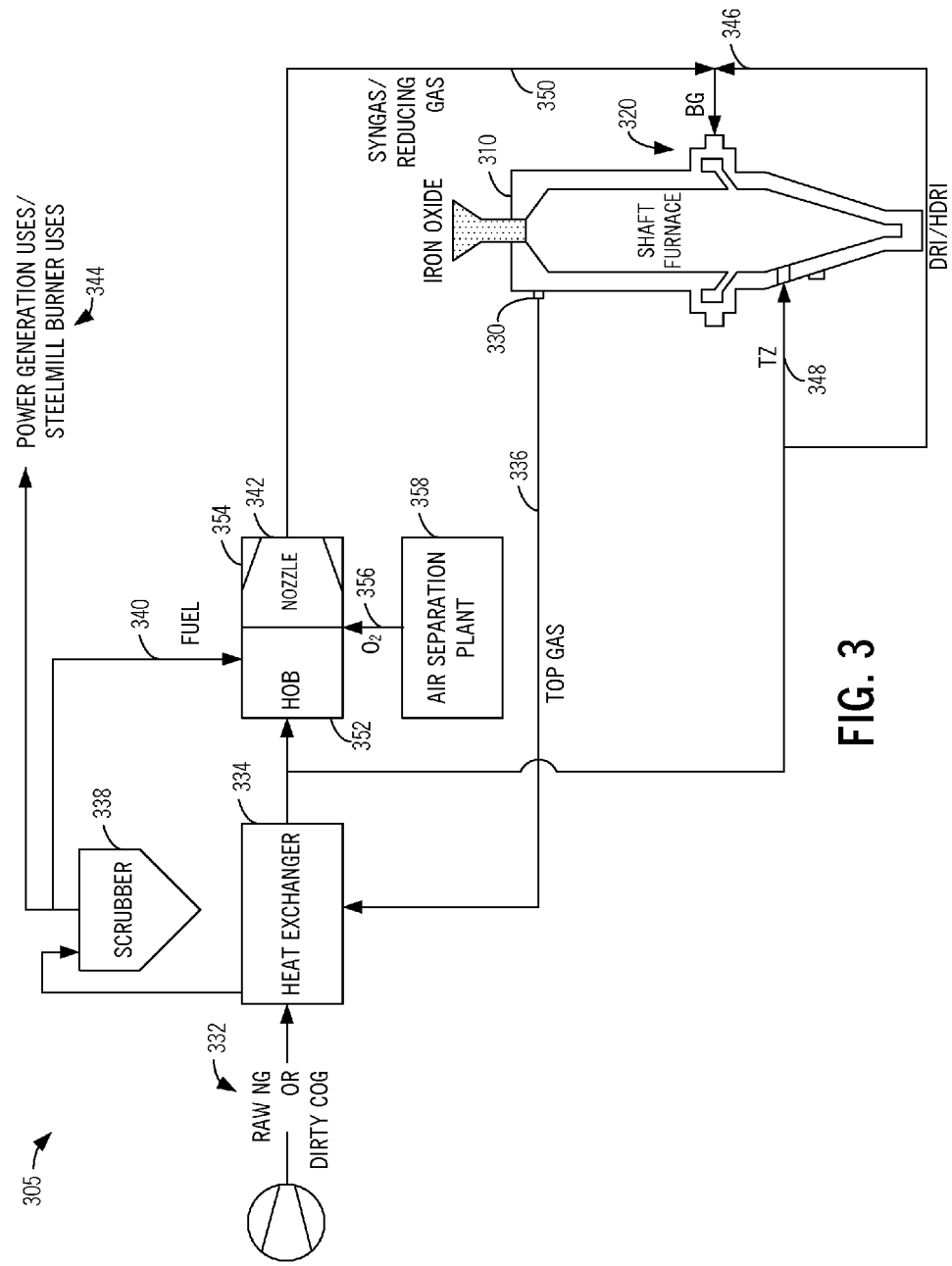
FIG. 3 is a schematic diagram illustrating one exemplary embodiment of a novel once-through (i.e. no recycle) system and method for reducing iron oxide to metallic iron using clean or raw NG of the present invention.

Referring now specifically to FIGS. 1-3, the systems and methods of the present invention include and utilize individual components that are well known to those of ordinary skill in the art, and thus they are not illustrated or described in detail herein. These individual components are, however, variously combined to form an inventive whole. The individual components include, but are not limited to, a conventional DR shaft furnace, boilers, coolers/scrubbers, $CO_2$ removal systems, compressors, saturators, gas heaters, heat exchangers, gas sources (and/or appropriate gas storage vessels), and the like.

In general, the DR shaft furnace 110, 210, 310 has an upper portion where iron ore in the form of pellets, lumps, agglomerates, etc. is fed. The reduced pellets, lumps, agglomerates, etc. are removed at a lower portion of the DR shaft furnace 110, 210, 310 as DRI. A reducing gas/syngas inlet 120, 220, 320 is located between the feed charge and the product discharge, and supplies hot reducing gas/syngas to the DR shaft furnace 110, 210, 310. This hot reducing gas/syngas contains $CH_4$, which, conventionally, is reformed near the gas inlet 120, 220, 320 of the DR shaft furnace 110, 210, 310 by $CO_2$ and water ($H_2O$) contained in the hot reducing gas/syngas to produce additional $H_2$, CO, and carbon (C). The hot direct reduced iron (HDRI) acts as a catalyst in the reforming reaction. Following this reforming reaction, the hot reducing gas/syngas containing $H_2$ and CO reduces the iron oxide to metallic iron and exits the DR shaft furnace 110, 210, 310 as spent reducing gas (or top gas) through an offtake pipe at the top portion of the DR shaft furnace 10. This top gas 130, 230, 330 may then be withdrawn and recycled for a variety of purposes.

As described above, in various exemplary embodiments, the present invention provides systems and methods that replace the conventional reformer with an alternative component that can convert clean or raw NG, clean or dirty COG, or the like to reducing gas/syngas suitable for DR with minimal processing or cleaning Hydrocarbons and the like are converted to $H_2$ and CO. S does not affect the conversion to reducing gas/syngas, but is removed or otherwise cleaned up by the iron bed in the DR shaft furnace. Top gas may be continuously recycled or a once-through approach may be employed. Again, it should be noted that, DRI contaminated with high levels of S may not be suitable as EAF feedstock, but may be suitable as metalized feedstock to a blast furnace, for example.

Referring now specifically to FIG. 1, in one exemplary embodiment of the present invention, systems and methods 105 are provided for reducing iron oxide to metallic iron using clean or raw NG, clean or dirty COG, or the like in a low-carbon (up to about 1-2%) DR plant, such as an HBI plant or the like. This exemplary embodiment uses clean or raw NG, clean or dirty COG, or the like up to about 250 $m^3$/t DRI for NG and 500-600 $m^3$/t DRI for COG. Recycled top gas 130 is removed from the DR shaft furnace 110 and fed to a boiler 132 and cooler/scrubber 134 for steam generation, water removal, cooling, and/or cleaning, resulting in a recycled top gas 136 saturated at a temperature of between about 30 degrees C. and about 45 degrees C. This recycled top gas 136 is then split into multiple streams. The first stream 138 is fed to an absorption type $CO_2$ removal unit 140 or the like, which removes about 95% of the $CO_2$ and S (as $H_2S$) from this first stream 138, and a gas heater 142, which heats the first stream 138 to a temperature of between about 900 degrees C. and about 1100 degrees C., thereby providing a reducing gas stream 144 that is fed into the DR shaft furnace 110. Oxygen ($O_2$) 146 may be added to the reducing gas stream 144, as necessary, prior to the reducing gas stream 144 being fed into the DR shaft furnace 110. Optionally, the $CO_2$ removal unit 140 is a membrane type $CO_2$ removal unit, a pressure swing adsorption (PSA) unit, a vacuum pressure swing adsorption (VPSA) unit, etc. Steam 148 from the boiler 132 may be used by the absorption type $CO_2$ removal unit 140 or for other uses, including power generation. $CO_2$ and nitrogen ($N_2$) are also removed via the gas heater flue 150, for example. The second stream 152 is used as gas heater fuel. The third stream 154 is used to fire a preheater 156. A supply of compressed clean or raw NG, clean or dirty COG, or the like 158 is processed through the preheater 156, and preheated to a temperature of between about 300 degrees C. and about 500 degrees C. Both $CO_2$ and $N_2$ 160 are vented, as necessary, through the preheater 156. Prior to preheating, a portion of the NG or COG 158 may be used as gas heater fuel 162. Advantageously, post-preheating, a portion of the NG or COG 158 may be provided to the DR shaft furnace 110 as bustle (enrichment) gas (BG) 164 and a portion of the NG or COG 158 may be delivered to the DR shaft furnace 110 as transition zone (TZ) gas 166. The remainder of the NG or COG 158 is processed by a TRS 168 to form a syngas stream 170 that is added to the previously mentioned reducing gas stream 144. A portion of the syngas stream 171 may be added to the inlet of the gas heater 142 to provide additional moisture, such that C buildup in the gas heater 142 is prevented. Preferably, the syngas stream 170 consists of at least about 82% $H_2$ and CO. In general, the TRS 168 includes a hot oxygen burner (HOB) 172 and a nozzle 174. Fuel 176 derived from the recycled top gas stream 136 is combined with $O_2$ 178 from an air separation plant 180 or the like in the HOB 168 and, at high temperature (i.e. 2,000-2,500 degrees C.), is accelerated through the nozzle 174 and contacted with the NG or COG 158 to form the syngas stream 170. The use of the NG or COG 158 in the BG and the TZ gas allows for control of the carbon content of the resulting DRI, as well as the temperature of the bed in the DR shaft furnace 110.

Referring now specifically to FIG. 2, in another exemplary embodiment of the present invention, systems and methods 205 are provided for reducing iron oxide to metallic iron using clean or raw NG, clean or dirty COG, or the like in a high-carbon (greater than about 2%) DR plant or the like. Recycled top gas 230 is removed from the DR shaft furnace 210 and fed to a boiler 232 and cooler/scrubber 234 for steam generation, water removal, cooling, and/or cleaning, resulting in a recycled top gas 236 saturated at a temperature of between about 30 degrees C. and about 45 degrees C. This recycled top gas 236 is then split into multiple streams. The first stream 238 is fed to an absorption type $CO_2$ removal unit 240 or the like, which removes about 95% of the $CO_2$ and S (as $H_2S$) from this first stream 238, a saturator 241, which removes $H_2O$ from this first stream 238, and a gas heater 242, which heats the first stream 238 to a temperature of between about 900 degrees C. and about 1100 degrees C., thereby providing a reducing gas stream 244 that is fed into the DR shaft furnace 210. $O_2$ 246 may be added to the reducing gas stream 244, as necessary, prior to the reducing gas stream 244 being fed into the DR shaft furnace 210. Optionally, the $CO_2$ removal unit 240 is a membrane type $CO_2$ removal unit, a PSA unit, a VPSA unit, etc. Steam 248 from the boiler 232 may be used by the absorption type $CO_2$ removal unit 240 or for other uses, including power generation. $CO_2$ and $N_2$ are also removed via the gas heater flue 250, for example. The second stream 253 is used as gas heater fuel. A supply of compressed clean or raw NG, clean or dirty COG, or the like 258 is processed through a heat exchanger 256, and preheated to a temperature of between about 300 degrees C. and about 500 degrees C. Optionally, the heat exchanger 256 operates by cross-exchange with a still heated syngas 270, as described in greater detail below. Prior to preheating, a portion of the NG or COG 258 may be used as gas heater fuel 262. Again, a portion of the preheated NG or COG 258 may be delivered to the DR shaft furnace 210 as BG 265 and a portion of the preheated NG or COG 258 may be delivered to the DR shaft furnace 210 as TZ gas 275. Again, the remainder of the preheated NG or COG 258 is processed by a TRS 268 to form the heated syngas 270. Preferably, the heated syngas 270 consists of at least about 82% $H_2$ and CO and is generated by the TRS 268 and a recycle loop including the TRS 268, a boiler 284 (which also generates steam 286 for use in the $CO_2$ removal unit 240), and the heat exchanger 256, which cools the preheated and reacted NG or COG stream to form the syngas 270. In general, the TRS 268 includes an HOB 272 and a nozzle 274. Fuel 276 derived from the recycled top gas stream 252 is combined with $O_2$ 278 from an air separation plant 280 or the like in the HOB 272 and, at high temperature (i.e. 2,000-2,500 degrees C.), is accelerated through the nozzle 274 and contacted with the preheated NG or COG 258 to form the syngas stream 270. The syngas stream 270 is preferably combined with the reducing gas stream 244 between the $CO_2$ removal unit 240 and the saturator 241. However, in all exemplary embodiments, it should be noted that the syngas stream 270 (170 in FIG. 1), if it contains high levels of $CO_2$ and/or S, can be advantageously introduced upstream of the $CO_2$ removal unit 240 (140 in FIG. 1), to remove excess $CO_2$ and/or $H_2S$. Again, $O_2$ 246 may be added to the reducing gas stream 244 prior to injection into the DR shaft furnace 210. In this embodiment, given the higher carbon content involved, less $H_2O$ is desirable in order to have the proper ratio of reducing gases to oxidizing gases. Thus, the approximately 1,200-degree C. temperature leaving the TRS 268 is reduced to approximately 400-600 degrees C. by the boiler 284, which is reduced to approximately 200 degrees C. by the heat exchanger 256. The saturator 241 then takes the approximately 12%-$H_2O$ syngas stream 270 and, when combined with the recycled top gas stream 238, reduces the moisture content to approximately 2-6%. Again, the use of the NG or COG 258 in the BG and the TZ gas allows for control of the carbon content of the resulting DRI, as well as the temperature of the bed in the DR shaft furnace 210.

Referring now specifically to FIG. 3, in a further exemplary embodiment of the present invention, systems and methods 305 are provided for reducing iron oxide to metallic iron using clean or raw NG, clean or dirty COG, or the like on a once-through (i.e. no recycle) basis. This alternative exemplary embodiment allows clean or raw NG, clean or dirty COG, or the like to be used to both produce metallic iron and generate power, as well as in a steelmaking facility, in applications where such multi-functionality desired. A supply of compressed NG or COG 332 is processed through a heat exchanger 334, and heated to a temperature of between about 300 degrees C. and about 500 degrees C. A spent top gas stream 336 is cooled and/or cleaned in the heat exchanger 334 and a scrubber 338 and the resulting gas stream may be used as fuel 340 for a TRS 342 or the like and/or for power generation/steelmill burners 344. Again, a portion of the heated NG or COG 332 may be delivered to the DR shaft furnace 310 as BG enrichment 346 and a portion of the heated NG or COG 332 may be delivered to the DR shaft furnace 310 as TZ gas 348. The remainder of the heated NG or COG 332 is processed by the TRS 342 to form a syngas/reducing gas stream 350. Preferably, the syngas/reducing gas stream 350 consists of a reductant-to-oxidant ratio of about 5-to-6. In general, the TRS 342 includes an HOB 352 and a nozzle 354. Fuel 340 derived from the heat exchanger 334, for example, is combined with $O_2$ 356 from an air separation plant 358 or the like in the HOB 352 and, at high temperature (i.e. 2,000-2,500 degrees C.), is accelerated through the nozzle 354 and contacted with the compressed heated NG or COG 332 to form the syngas/reducing gas stream 350. Again, the use of the NG or COG 332 in the BG and the TZ gas allows for control of the carbon content of the resulting DRI, as well as the temperature of the bed in the DR shaft furnace 310.

As described above, in various exemplary embodiments, the present invention provides systems and methods that replace the conventional reformer with an alternative component that can convert clean or raw NG, clean or dirty COG, or the like to reducing gas/syngas suitable for DR with minimal processing or cleaning Hydrocarbons and the like are converted to $H_2$ and CO. S does not affect the conversion to reducing gas/syngas, but is removed or otherwise cleaned up by the iron bed in the DR shaft furnace. Top gas may be continuously recycled or a once-through approach may be employed. Again, it should be noted that, DRI contaminated with high levels of S may not be suitable as EAF feedstock, but may be suitable as metalized feedstock to a blast furnace, for example.

Although the present invention has been illustrated and described herein with reference to preferred embodiments and specific examples thereof, it will be readily apparent to those of ordinary skill in the art that combinations of these embodiments and examples and other embodiments and examples may perform similar functions and/or achieve like results. All such equivalent embodiments and examples are within the spirit and scope of the present invention, are contemplated thereby, and are intended to be covered by the following claims.

What is claimed is:

1. A method for reducing iron oxide to metallic iron, comprising:
   providing a top gas stream from a direct reduction shaft furnace;
   removing carbon dioxide from the top gas stream using a carbon dioxide removal system;
   heating the top gas stream in a gas heater to form a reducing gas stream and providing the reducing gas stream to the direct reduction shaft furnace to reduce the iron oxide to the metallic iron, wherein a portion of the top gas stream is provided to the gas heater as fuel; and
   adding one of a natural gas stream and a coke oven gas stream to the reducing gas stream as a synthesis gas stream.

2. The method of claim 1, wherein the one of the natural gas stream and the coke oven gas stream comprises one or more of a hydrocarbon, hydrogen, carbon monoxide, carbon dioxide, and sulfur.

3. The method of claim 1, further comprising preheating the one of the natural gas stream and the coke oven gas stream in a preheater prior to adding the one of the natural gas stream and the coke oven gas stream to the reducing gas stream as the synthesis gas stream.

4. The method of claim 3, further comprising reacting the preheated one of the natural gas stream and the coke oven gas stream in a thermal reaction system to form the synthesis gas stream.

5. The method of claim 4, wherein the thermal reaction system comprises an oxygen burner and a nozzle and utilizes oxygen and a fuel.

6. The method of claim 5, wherein the oxygen is received from an air separation plant.

7. The method of claim 5, wherein the fuel comprises a portion of the top gas stream.

8. The method of claim 3, further comprising firing the preheater with a portion of the top gas stream.

9. The method of claim 3, further comprising providing a portion of the preheated one of the natural gas stream and the coke oven gas stream to the direct reduction shaft furnace as one or more of bustle enrichment gas and transition zone gas.

10. The method of claim 9, further comprising adding oxygen to the bustle enrichment gas.

11. The method of claim 1, further comprising providing a portion of the one of the natural gas stream and the coke oven gas stream to the gas heater as fuel.

12. The method of claim 1, further comprising generating steam in a boiler using sensible heat of the top gas stream and utilizing the steam in the carbon dioxide removal system.

13. A method for reducing iron oxide to metallic iron, comprising:
   providing a top gas stream from a direct reduction shaft furnace;
   removing carbon dioxide from the top gas stream using a carbon dioxide removal system;
   subsequently removing moisture from one or more of the top gas stream and a synthesis gas stream using a saturator;
   subsequently heating the top gas stream in a gas heater to form a reducing gas stream, adding oxygen to the reducing gas stream, and providing the reducing gas stream to the direct reduction shaft furnace to reduce the iron oxide to the metallic iron; and
   adding one of a natural gas stream and a coke oven gas stream to the top gas stream as the synthesis gas stream.

14. The method of claim 13, wherein the one of the natural gas stream and the coke oven gas stream comprises one or more of a hydrocarbon, hydrogen, carbon monoxide, carbon dioxide, and sulfur.

15. The method of claim 13, further comprising preheating the one of the natural gas stream and the coke oven gas stream in a heat exchanger to form the synthesis gas stream.

16. The method of claim 15, further comprising reacting the preheated one of the natural gas stream and the coke oven gas stream in a thermal reaction system to form the synthesis gas stream.

17. The method of claim 16, wherein the thermal reaction system comprises an oxygen burner and a nozzle and utilizes oxygen and a fuel.

18. The method of claim 17, wherein the oxygen is received from an air separation plant.

19. The method of claim 17, wherein the fuel comprises a portion of the top gas stream.

20. The method of claim 16, further comprising cooling the preheated and reacted one of the natural gas stream and the coke oven gas stream in a boiler and the heat exchanger to form the synthesis gas stream.

21. The method of claim 16, further comprising generating steam in a second boiler using the preheated and reacted one of the natural gas stream and the coke oven gas stream and utilizing the steam in the carbon dioxide removal system.

22. The method of claim 15, wherein the heat exchanger operates by cross-exchange with the synthesis gas stream.

23. The method of claim 15, further comprising providing a portion of the preheated one of the natural gas stream and the coke oven gas stream to the direct reduction shaft furnace as one or more of bustle enrichment gas and transition zone gas.

24. The method of claim 13, further comprising providing a portion of the one of the natural gas stream and the coke oven gas stream to the gas heater as fuel.

25. The method of claim 13, further comprising generating steam in a first boiler using the top gas stream and utilizing the steam in the carbon dioxide removal system.

26. The method of claim 13, further comprising providing a portion of the top gas stream to the gas heater as fuel.

27. A method for reducing iron oxide to metallic iron, comprising:
providing one of a natural gas stream and a coke oven gas stream;
preheating the one of the natural gas stream and the coke oven gas stream in a heat exchanger;
reacting the preheated one of the natural gas stream and the coke oven gas stream in a thermal reaction system to form a reducing gas stream; and
providing the reducing gas stream to a direct reduction shaft furnace to reduce the iron oxide to the metallic iron.

28. The method of claim 27, wherein the one of the natural gas stream and the coke oven gas stream comprises one or more of a hydrocarbon, hydrogen, carbon monoxide, carbon dioxide, and sulfur.

29. The method of claim 27, wherein the thermal reaction system comprises an oxygen burner and a nozzle and utilizes oxygen and a fuel.

30. The method of claim 29, wherein the oxygen is received from an air separation plant.

31. The method of claim 29, wherein the fuel comprises a portion of a top gas stream derived from the direct reduction shaft furnace that is cooled in the heat exchanger and cleaned in a scrubber.

32. The method of claim 31, wherein the one of the natural gas stream and the coke oven gas stream is preheated in the heat exchanger by cross-exchange with the top gas stream.

33. The method of claim 31, further comprising utilizing a remaining portion of the cooled/cleaned top gas stream in one or more of a power generation system and a steelmaking facility.

34. The method of claim 27, further comprising providing a portion of the preheated one of the natural gas stream and the coke oven gas stream to the direct reduction shaft furnace as one or more of bustle enrichment gas and transition zone gas.

* * * * *